United States Patent [19]

Mailloux et al.

[11] Patent Number: 5,483,351
[45] Date of Patent: Jan. 9, 1996

[54] DILATION OF IMAGES WITHOUT RESOLUTION CONVERSION TO COMPENSATE FOR PRINTER CHARACTERISTICS

[75] Inventors: Louis D. Mailloux, Fairport; Thomas Robson, Penfield, both of N.Y.

[73] Assignee: Xerox Corporation, Stamford, Conn.

[21] Appl. No.: 435,045

[22] Filed: May 8, 1995

Related U.S. Application Data

[63] Continuation of Ser. No. 951,523, Sep. 25, 1992.

[51] Int. Cl.[6] .............................. H04N 1/40; G06K 9/40
[52] U.S. Cl. ...................... 358/298; 358/447; 382/254; 382/308
[58] Field of Search ...................... 358/298, 443, 358/447, 448, 455–466; 347/129, 224; 382/54, 55; 395/109

[56] References Cited

U.S. PATENT DOCUMENTS

| | | | |
|---|---|---|---|
| 4,354,337 | 10/1982 | Sekigawa | 358/284 |
| 4,437,122 | 3/1984 | Walsh et al. | 358/166 |
| 4,450,483 | 5/1984 | Coviello | 358/166 |
| 4,847,641 | 7/1989 | Tung | 346/154 |
| 4,903,316 | 2/1990 | Hongo et al. | 358/464 X |
| 5,046,120 | 9/1991 | Bishop | 382/54 |
| 5,050,000 | 9/1991 | Ng | 358/298 |
| 5,200,841 | 4/1993 | Kotaki et al. | 358/455 |
| 5,299,308 | 3/1994 | Suzuki et al. | 358/456 |

*Primary Examiner*—Peter S. Wong
*Assistant Examiner*—Eric Frahm
*Attorney, Agent, or Firm*—R. Christine Jacobs

[57] ABSTRACT

An image compensation system which provides dilation or erosion of image features using halfbitting or fullbitting in the rendition of bitmap images, especially on a write-white printer. A region of pixels of an image is isolated which includes two or more correctable pixel locations. A set of state determination rules, based on the formation of pixels in the isolated region, is used to determine a corrected binary pixel state for each of the correctable pixels. Corrections for one correctable pixel may be considered in the state determination rules for adjacent correctable pixels. A single enhanced output pixel is provided for each image input pixel, thereby preserving the original image resolution. Performing enhancements on multiple input pixels simultaneously increases the system throughput.

13 Claims, 9 Drawing Sheets

|   |   |   |   |
|---|---|---|---|
| p | q | n | m |
| j | a | b | c |
| k | d | [E1] e | f |
| l | g | h | i |

|   |   |   |   |
|---|---|---|---|
| p | q | n | m |
| a | b | c | j |
| d | [E2] e | f | k |
| g | h | i | l |

|   |   |   |   |
|---|---|---|---|
| a | b | c | j |
| d | [E3] e | f | k |
| g | h | i | l |
| p | q | n | m |

|   |   |   |   |
|---|---|---|---|
| j | a | b | c |
| k | d | [E4] e | f |
| l | g | h | i |
| p | q | n | m |

DILATION OF IMAGES WITHOUT RESOLUTION CONVERSION TO COMPENSATE FOR PRINTER CHARACTERISTICS

FIELD OF THE INVENTION

This is a continuation, of application Ser. No. 07/951,523, filed Sep. 25, 1992.

The present invention relates to a system for converting bitmap images in a first print format into a second print format, particularly where the second print format uses a line-thinning printer technology. More specifically, the invention relates to an improved technique for providing dilation or erosion of image features using halfbitting or fullbitting in the rendition of bitmap images on a write-white printer.

BACKGROUND OF THE INVENTION

It is a generally known requirement of certain computer graphic output devices to optimize digital input images prior to outputting them at a predefined output resolution (pixel density or raster density). Specifically, printer systems capable of printing image data and/or character data have become widely used. A particular problem arises when images that have been previously optimized for a specific printing technology are printed on a printer utilizing a different printing technology. "Write-black" refers Go an electrophotographic printing process in which the elements or portions of the image that will attract black toner for eventual transfer to a copy substrate are discharged with an exposure device, such as a laser. By contrast, "write-white" refers to an electrophotographic printing process in which the portions of the image that will not receive toner are discharged with an exposure device.

Thus, for example, images may be optimized for write-black printer technology, which tends to thicken elements such as lines because the optical input has a width greater than the pixel width, and subsequently transmitted to a write-white printer, which tends to thin elements because the discharged areas adjacent to lines areas spread into the domain of the line. Such images will appear undesirably lighter, because the original optimization for the expected write-black printer thins the elements in the image, and when such an optimized image is sent instead to a write-white printer, which further thins image elements, the result will be lines that are too thin. Single pixel lines will tend to be invisible.

To compensate for the differences in write-white versus write-black printers, the edges of image features are detected, and dilated (expanded) or eroded (shrunk). The increment of darkening or lightening is generally limited to one pixel, unless halfbitting techniques are used. Halfbitting is a technique for increasing the effective resolution of a printer for large coherent objects such as lines and curves. It involves approximating some boundaries of objects by alternating pixels along a line between white and black, effectively dilating or eroding that boundary by a half pixel. Halfbitting is used when dilation of a full bit might result in an image element that is too thick, or too dark.

FIG. 1 shows a portion of an image element 10. In optimizing an image formatted for write-black printing, edges are slightly eroded to account for the thickening properties of the print format. If, however, this optimized image were printed on a write-white printer, the same edge would then appear very thin. This can be corrected by slightly thickening, or dilating, a black object when reformatting the image for printing on a write-white printer. The outline 12 shows a desired dilation by one half bit for this image element. To approximate this thickening on a printer without changing the resolution of the image, a technique called "halfbitting" is used. This is accomplished by placing alternating black pixels along the edge of the object. With pixel 14 being black, pixel 16 is left white. The printed image element so halfbitted will appear about one half pixel thicker than a similar but non-halfbitted image element printed in the original, write-black optimized format on a write-white printer.

To accomplish dilation of an image element without increasing the resolution of the image, four conditions must be considered. FIGS. 2–5 illustrate the four possible conditions that must be considered in dilating an image element by a half or a full bit.

FIG. 2(a) shows a portion of an image element 20 that contains a smooth edge with no halfbitting. The first condition, a half bit expansion on an image without halfbitting is shown in FIG. 2(b), image element 22. The image element is expanded by adding alternating black bits along the edge of the element. Second, an image element with halfbitting may be expanded by another half bit, or "filled." FIG. 3 illustrates the second condition, in which a previously halfbitted image element 24 is filled by a further half bit dilation, as shown in FIG. 3(b). Again, halfbitting is accomplished by adding alternating black bits along the edge of the image element, resulting in a smoothing of the element, as shown by element 26.

In the third condition, a portion of image element 30 without halfbitting may also be expanded by a Full bit, as shown in FIG. 4(b) by image portion 32.

FIG. 5 shows the fourth condition, in which a portion of an image element 34 that includes a halfbitted edge is expanded by a full bit, as shown by image element portion 36. Alternate white pixels, such as pixel 38, are filled by black pixel 39 as shown in FIG. 5(b), in essentially the same manner as in the second case of half bit filling. An additional half bit dilation, as shown by pixel 40, completes the full bit dilation.

The considerations for eroding an image element are essentially the same, with an image element being shrunk by a half or full bit, or white pixels added to replace black pixels, instead of expanded.

Template matching techniques have been proposed for enhancing images by more precisely controlling the size, positioning and number of pixels that are printed on a xerographic photoreceptor to render bitmap images. Walsh et al., U.S. Pat. No. 4,437,122, describes a method of enhancing the resolution and quality of characters of a system receiving video display pixel information and providing hard copy output. The system accomplishes this by storing at least three successive lines of video data in successive parallel connected shift registers, applying the output of the shift registers to a decoder, and generating driving signals for a printer head. The decoder compares the pixels on the same line as well as in preceding and succeeding lines that surround each specific input pixel to generate the printer head driving signal according to whether straight or curved line segments are to be formed. Enhancement of the central pixel may be determined by progressively examining an ordered table of matches to find an equivalent image segment and its related enhancement, and outputting an increased resolution image portion with a plurality of bits, incorporating the enhancement to the target pixel.

As shown in FIG. 6, for example, for image element portion 50 a (3×3) pixel window 52 may be isolated in order to enhance pixel 54 using a template matching pixel enhancement method. As pixel window 52 is incrementally passed over an image element edge, its central pixel 54 is identified and is compared with the pixels surrounding it. Depending on the desired characteristics of the output image and the templates used, pixel 54 may be made black when it is adjoining the state transition, as shown in the figure. In most template matching enhancement techniques, the system will simply move to the next pixel for enhancement, in this case isolating pixel 56 within (3×3) pixel window 58. Without the information that the output for pixel 54 was made black, the same template match that indicated that pixel 54 should be black will indicate that pixel 56 should also be made black, since the surrounding pixel pattern in the (3×3) window is the same. This method will effectively dilate the image element by a full bit instead of a half bit.

Alternatively, pixel 54 may be expanded in resolution similar to the method shown in Walsh, so that a plurality of pixels would be generated to represent the enhancement to pixel 54. Although the plurality of pixels representing the enhancement to pixel 54 could be developed in order to provide halfbitting, the resolution of the image would be greater and would require a display device or printer capable of displaying the higher resolution enhanced image.

However, satisfying the first condition of image dilation described above, of applying halfbitting to an image element without any previous halfbitting, requires that at least two adjacent pixels must be enhanced in conjunction, so that changes to one pixel may be taken into account in the enhancement determination of the corrected state of the second. It is an object of the present invention to provide a method for performing half bit and full bit dilation or erosion on elements in an image without affecting the resolution of the original image.

Existing template matching enhancement techniques which produce for each input pixel an output of one or more enhanced output pixels may effectively produce enhanced outputs for the last three conditions. The method of the present invention is also effective in producing an enhanced output for the last three conditions, and can also provide enhanced output for the first condition, as well. In addition, by providing correction for 4 pixels in each pass rather than just one pixel at a time, the throughput for the system is significantly increased over systems which correct for each pixel individually.

SUMMARY OF THE INVENTION

The present invention provides a method for compensating for the difference in print format for an image formatted for one format that is being printed on a printer with a different print format. A region of pixels is isolated which includes two or more correctable pixel locations. A set of state determination rules is used to determine a corrected binary pixel state for each of the correctable pixels. The state determination rules are based on the formation of pixels in the isolated region. Corrections for one correctable pixel may be considered in the state determination rules For adjacent correctable pixels.

One aspect of the invention is based on the recognition of limitations in previous enhancement methods which output a pixel or pixels representing a single input pixel. Methods which produce a plurality of output pixels for a single image input pixel, which may or may not incorporate halfbitting in the output, increase the resolution of the image. Methods which produce a single output pixel representing a single image input pixel cannot effectively do half bit dilation or erosion, because output enhancements for previously considered input pixels cannot be taken into account in determining the enhanced value for an adjacent input pixel. This aspect is Further based on the discovery that these problems can be solved by performing enhancement operations on two or more adjacent pixel simultaneously so that the enhancement to one pixel can be considered in determining the enhancement to an adjacent pixel. A single enhanced output pixel is provided for each image input pixel, thereby preserving the original image resolution.

A further aspect of the present invention is based on the recognition that performing enhancements on multiple input pixels simultaneously increases the system throughput.

The following description, the drawings, and the claims further set forth these and other objects, features, and advantages of the invention.

BRIEF DESCRIPTION OF THE DRAWINGS

FIGS. 8(a), (b), (c) and (d) show template windows used by the method of the invention to determine the enhancement to the center four correctable pixels.

DETAILED DESCRIPTION

A. General Features of the Present Invention

Figure 6:
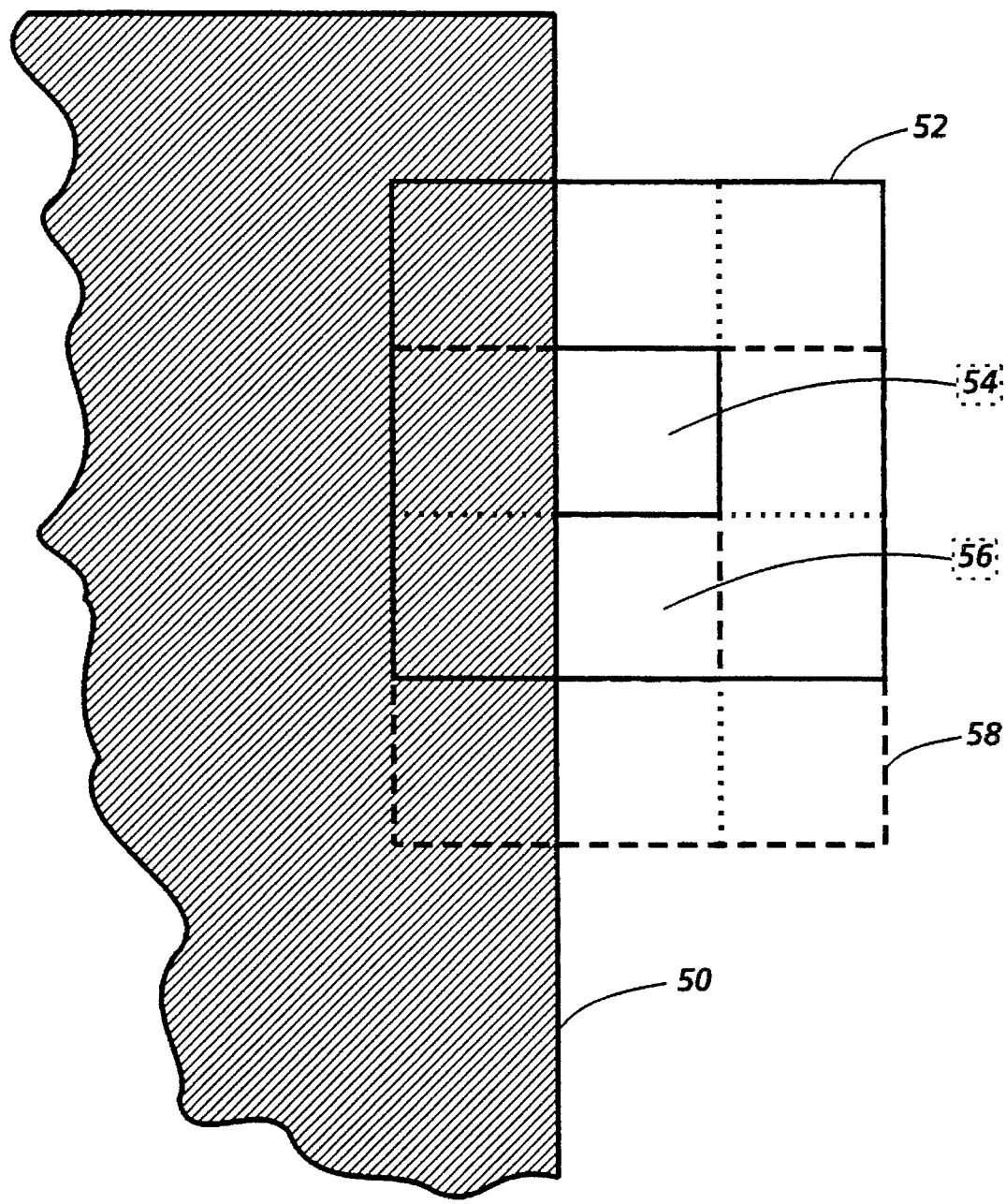
FIG. 6 shows an image element portion with (3×3) pixel enhancement windows isolated around individual correctable pixels, as in prior pixel enhancement methods.

Methods which provide independent enhanced output for a single bit are not able to provide half bit enhancement to smooth edges at the same resolution as the original image. Rather than using (3×3) pixel image enhancement windows as shown in FIG. 6, the present invention uses a (4×4) pixel image enhancement window for correcting four central pixels E1–E4 before being incremented by two pixels.

Figure 7:
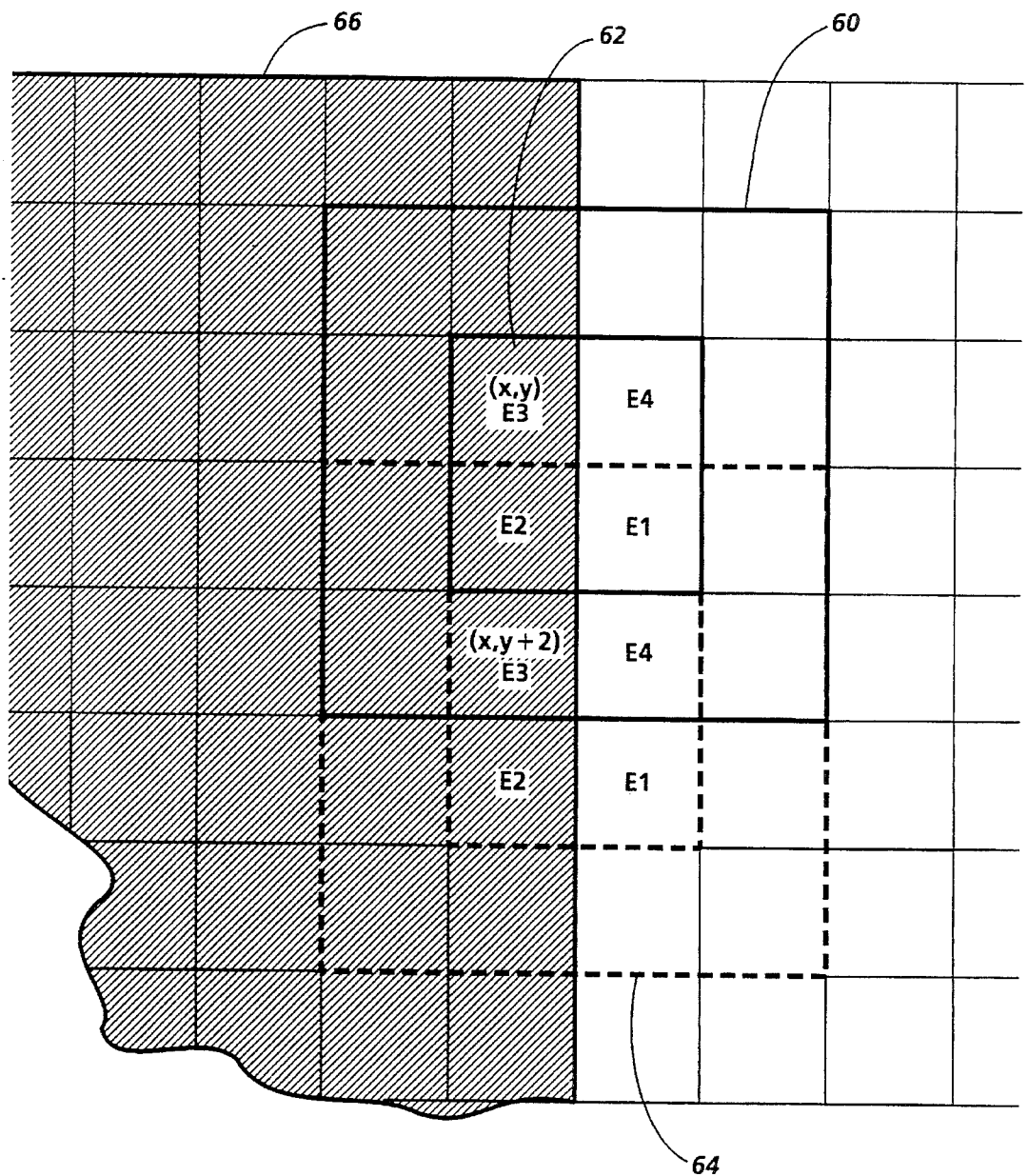
FIG. 7 shows (4×4) pixel windows used to effectively simultaneously correct four center pixels, according to the method of the invention.

FIG. 7 shows a (4×4) pixel window 60, used to correct the center 4 pixels E1–E4, effectively simultaneously. Pixel window 60 may be identified by the pixel coordinates (x, y) of the top left correctable pixel 62. In the figure, the central correctable pixels are each adjoining the state transition on the edge of the element portion. The window might also be positioned so that only two of the central pixels adjoin a state transition. Corrections for each of the four center correctable pixels are determined based on the states of the 16 pixels in the window, and on the enhancements made to the other three correctable pixels. When the enhancement for pixels E1–E4 is completed, the pixel enhancement window is incremented by two pixels in one direction. In the example shown, pixel enhancement window 64 has been incremented two pixels in the Y direction, so that pixel E3 is now located at (x, y−2).

B. An Implementation

The template windows in FIGS. 8(a), (b), (c), and (d) are used to determine the state determination rules to be used for each corrected pixel. The templates are used over the same 16 pixel region isolated by window 60. The method of the invention uses four different lookup tables one for each of the four central pixels, which determine corrections to that one pixel while considering enhancement corrections to the three adjacent correctable pixels.

Figure 9:
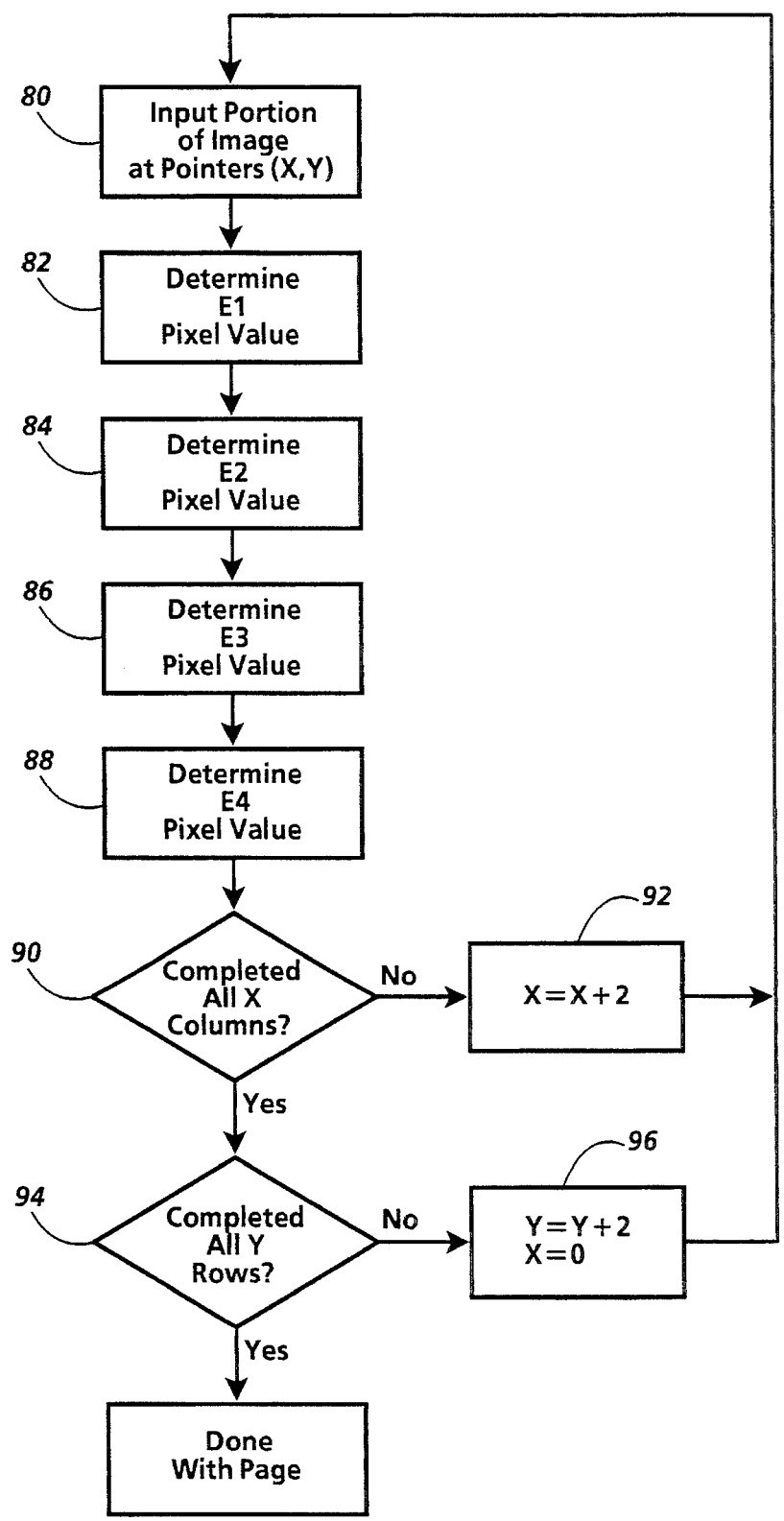
FIG. 9 is a flowchart showing steps in halfbit correction of a portion of an image element according to the method of the invention.

The flowchart of FIG. 9 shows the steps in half bit correction of a portion of an image according to the method of the invention. The step in box 80 inputs a window portion of an image at coordinates (X,Y). This may be a (4×4) region where the top left correctable pixel is at location (X,Y), as shown in FIG. 7. The step in box 82 determines a corrected value for the pixel at location E1, as shown in FIG. 8(a), by looking at the state of pixels a, b, c, d, e, f, g, h, and i, and then applying state determination rules found in a lookup table. If none of the state conditions specified in the rules are matched, the corrected pixel E1 is made the same as pixel "e." The step in box 84 determines a corrected value for the pixel at location E2, as shown in FIG. 8(b), by looking at the state of pixels a, b, c, d, e, f, g, h, and i, and then applying state determination rules found in a lookup table which take into account the enhancement made to pixel E1 in the step in box 82. The step in box 86 determines a corrected value for the pixel at location E3, as shown in FIG. 8(c), by looking at the state of pixels a, b, c, d, e, f g, h, and i, and then applying state determination rules found in a lookup table which take into account the enhancement made to pixel E2 in the step in box 84. The step in box 88 determines a corrected value for the pixel at location E4, as shown in FIG. 8(d), again by looking at the state of pixels a, b, c, d, e, f, g, h, and i, and then applying state determination rules found in a lookup table which take into account the enhancements made to pixels E1 and E3. The step in box 90 checks to see if all the x pixels in the current row have been corrected. If not, the step in box 92 increments the x position indicator by two pixels and returns to the step in box 80. If all the x pixels have been checked, the step in box 94 checks to see if all the y rows have been checked. If not, then the step in box 96 resets the column counter x, and increments the row counter y by two pixels. By stepping through the image by two pixels in each of the x and y directions, each pixel in the image is corrected in conjunction with 3 adjacent pixels.

The method of the invention of determining corrections for 4 pixels in each pass also works for the second, third, and fourth conditions for half and full bit dilation. Although these additional conditions may be satisfied by independent single bit enhancement methods, providing correction for 4 pixels in each pass significantly increases the throughput for all four cases over methods which correct each pixel individually.

Dilation of an image element according to the method of the invention is made based on the state of the pixels surrounding an identified correctable pixel. For half bit correction, the window of (4×4) pixels is used to determine the state of the corrected pixel. For dilation of an image element by halfbitting, the binary state of output pixels E1, E2, E3, or E4 as shown in FIGS. 7 and 8 is determined according to application of the following state determination rules:

For E1:

If pixels (b, d) are black; or
    if pixels (d,h) are black and pixel (f) is white; or
    if pixels (a,b) are black; or
    if pixels (a, d) are black; or
    if pixels (b, c) are black and pixel (h) is white; or
    if pixels (d,g) are black and pixel (i) is white; or
    if pixel (b) is black and pixels (a,c,d,f,g,h,i,j,m) are white; or
    if pixel (d) is black and pixels (a,b,c,f,g,h,i,l,o) are white;

make output pixel (E1) black;

otherwise E1=e.

For E2:

If pixels (b,d) are black; or
    if pixels (d,h) are black and pixel (f) is white; or
    if pixel (b) is black and pixels 1a, c,d,f,g,h,i,j,p) are white; or
    if pixel (d) is black and pixels (a,b,c,f,g,h,i,I) are white;

make output pixel (E2) black;

otherwise E2=e.

For E3:

If pixels (b,d) are black; or
    if pixels (d,h) are black and pixel (f) is white; or
    if pixels (a,b) are black; or
    if pixels (a,d) are black; or
    if pixels (b,c) are black and pixel (h) is white; or
    if pixels (d,g) are black and pixel (f) is white; or
    if pixel (b) is black and pixels (a,c,d,f,g,h,i,j) are white; or
    if pixel (d) is black and pixels (a,b,c,f,g,h,i,p) are white;

make output pixel (E3) black;

otherwise E3=e.

For E4:

If pixels (b,d) are black; or
    if pixels (d,h) are black and pixel (f) is white; or
    if pixel (b) is black and pixels (a,c,d,f,g,h,i,j) are white; or
    if pixel (d) is black and pixels (a,b,c,f,g,h,i,j,o) are white;

make output pixel (E4) black;

otherwise E4–e.

For dilation of an image element by a full bit, the current implementation uses only the 8 pixels immediately surrounding the correctable pixel. The binary state of output pixels E1, E2, E3, or E4 is made according to application of the following state determination rules:

For each E(n):

If pixels (a,b) are black; or
    if pixels (a,d) are black and pixel (f) is white; or
    If pixels (b,d) are black; or
    if pixels (d,h) are black and pixel (f) is white; or
    if pixels (b,c) are black and pixel (h) is white; or if pixels (d,g) are black and pixel (f) is white; or if pixel (b) is black and pixels (a,c,d,f,g,h,i) are white; or if pixel (a) is black and pixels (b,c,d,f,g,h,i) are white;

make output pixel (E(n)) black;

otherwise E(n)=e.

Figure 10A:
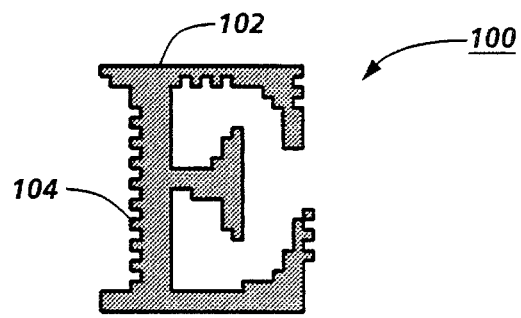
FIGS. 10(a), (b), and (c) show an example of the application of state rules to an image element portion according to the method of the invention.

An example of application of the state rules to an image element is shown in FIGS. 10(a), (b), and (c). FIG. 10(a) shows an image portion containing a character element 100, in this case an uppercase letter "E." This is a magnification of a 10-point, halfbitted character originally printed on a 300 dots per inch (dpi) printing system. Top edge 102 does not have any halfbitting. Side edge 104 shows an edge with half bit format.

Figure 10B:
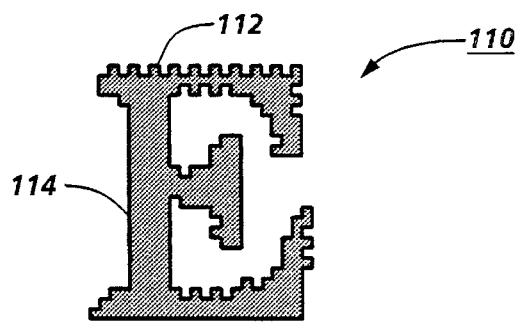

FIG. 10(b) shows a similar character 110, with the the character dilated by a half bit. Top edge 112 shows that alternating black and white pixel addition to the previously smooth edge 102. Side edge 114 shows how the previously halfbitted side 104 is filled by the half bit correction addition. In this implementation, the half bit dilation it added to the top and left of the image element. This may be manipulated as desired for a particular application by adjusting the state determining rules.

Figure 1:
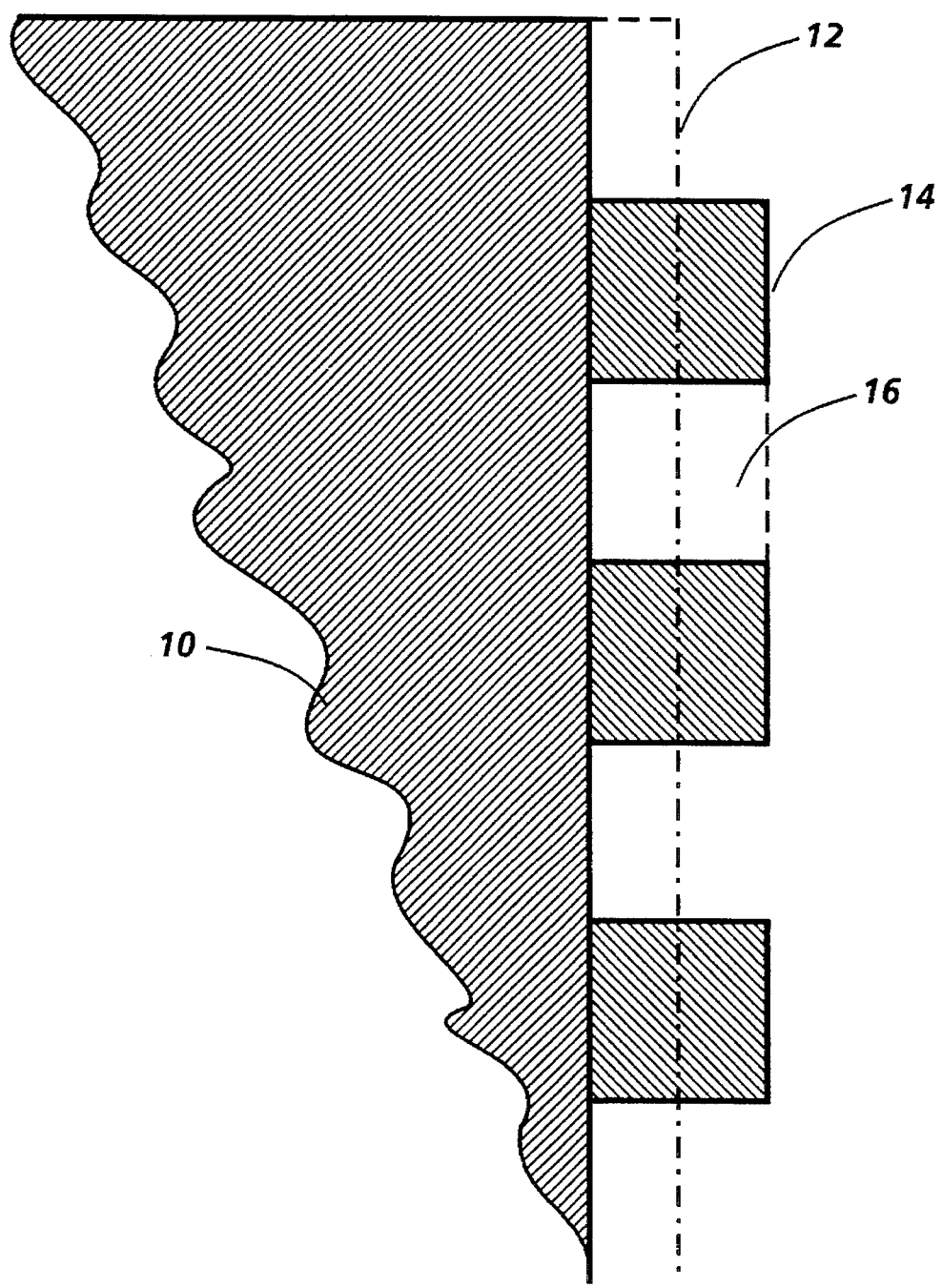
FIG. 1 shows a portion of an image element illustrating "halfbitting."
Figure 2A:
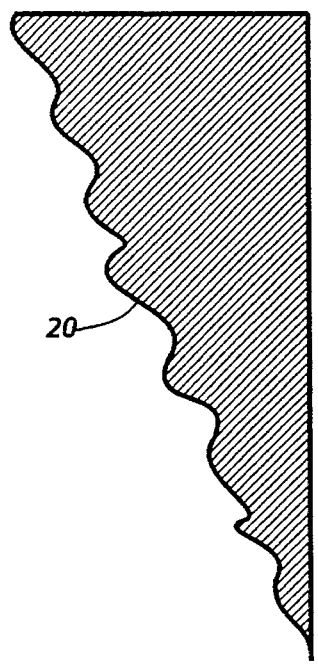
FIG. 2(a) shows a smooth image element portion with no halfbitting.
Figure 2B:
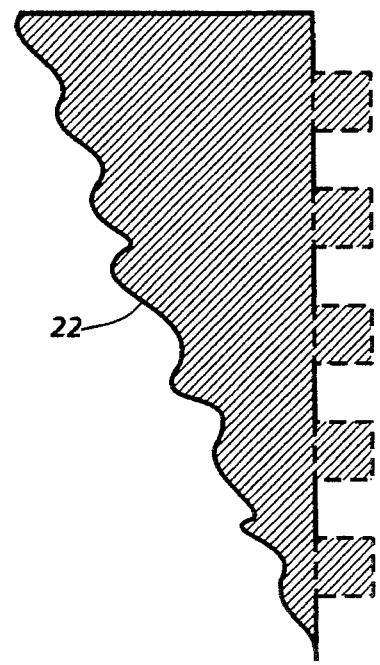
FIG. 2(b) shows a half bit expansion on the image element portion of FIG. 2(a).
Figure 3A:
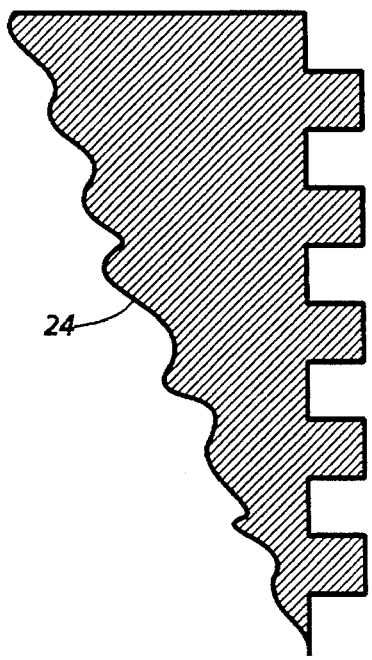
FIG. 3(a) shows a previously halfbitted image element portion.
Figure 3B:
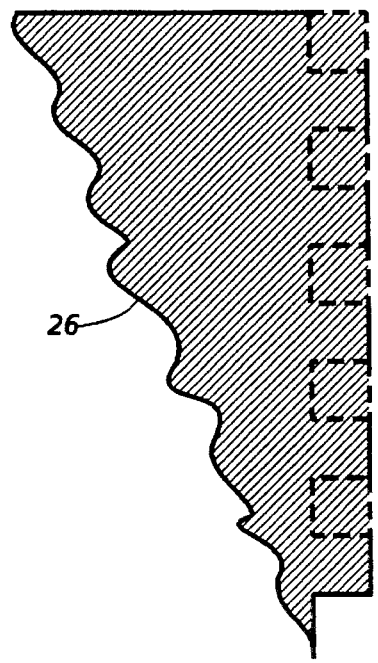
FIG. 3(b) illustrates "filling" by a further half bit dilation.
Figure 4A:
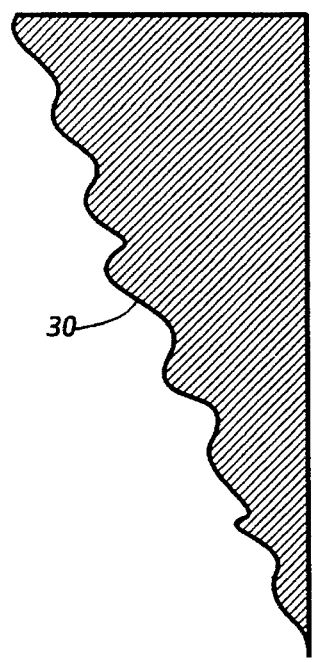
FIG. 4(a) shows an image element portion without halfbitting.
Figure 4B:
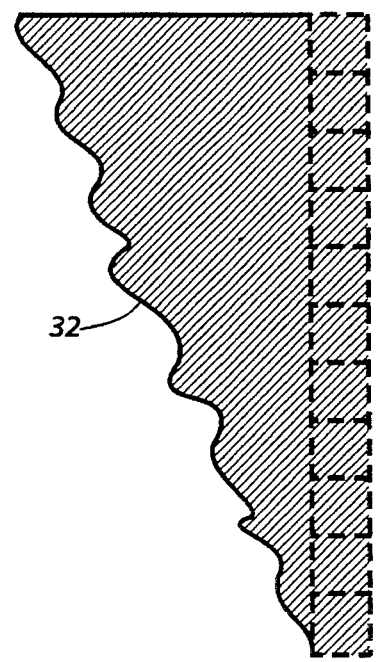
FIG. 4(b) shows the image element portion dilated by a full bit.
Figure 5A:
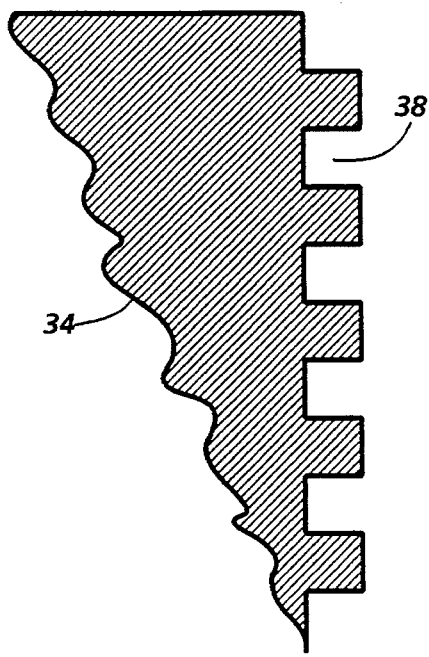
FIG. 5(a) shows a previously halfbitted image element portion.
Figure 5B:
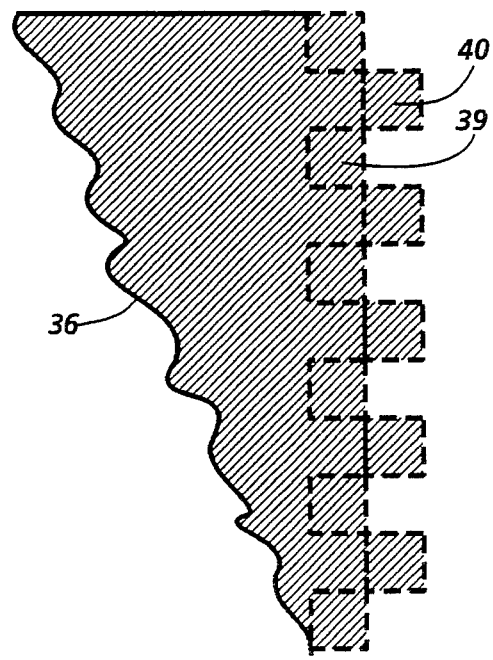
FIG. 5(b) shows the image element portion dilated by a full bit.
Figure 10C:
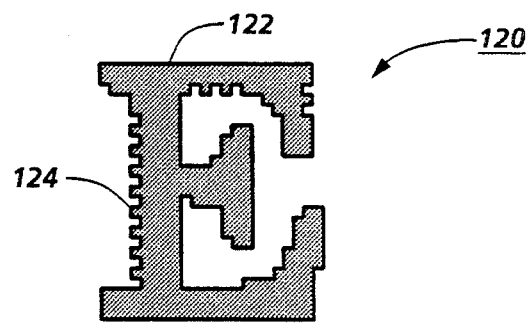

FIG. 10(c) shows a similar character 120, dilated by a full bit. Top edge 112 continues to be smooth with a full bit added to top edge 102. Side edge 124 still shows halfbitting. In this case, the original halfbitting has essentially been filled and another half bit added, for a total full bit dilation as described in relation to FIG. 5(b).

It is important to note that the resolution of characters 110 and 120 corrected by the method of the invention continues to be 300 dpi.

Figure 11:
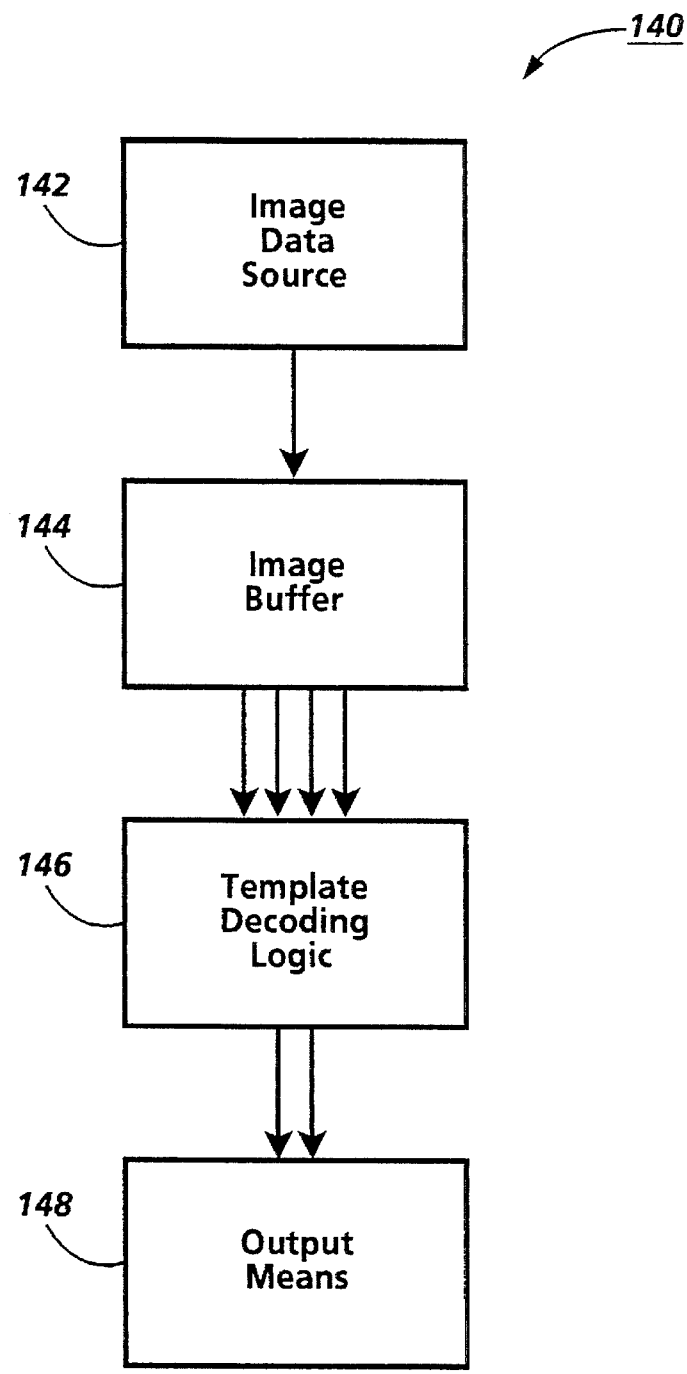
FIG. 11 shows a block diagram of an apparatus 140 for performing image compensation in accordance with the present invention.

FIG. 11 shows a block diagram of an apparatus 140 for performing image compensation in accordance with the present invention. Image Data Source 142 provides binary image data to Image Buffer 144, which may be a RAM. Alternatively, the image buffer might be a series of shift registers or other temporary storage. Image Buffer 144 stores a field of (L×N) pixels, where L is the number of bits in a line of the input, and N is the height of the input window. The number of bits L may vary by the input data source; for example, for a CRT the line length may be 1000 bits, but for a large-scale printer the number of bits in a line may be as much as 8000 bits.

Image Buffer 144 provides input data lines to Template Decoding Logic 146 to form the input window. In Template Decoding Logic 146, the input window is examined for matches with a set of templates determined by the state determination rules, as discussed above. Template Decoding Logic 146 examines primarily the pixels around the center axis of the window, and different templates in the set may be used for each correctable pixel position in the input window. Template Decoding Logic 146 may compare the data with the templates either serially or in parallel. The enhanced data for the correctable pixels is output from Template Decoding Logic 146 to Output Means 148, which may be a printer.

C. Miscellaneous

Although the method has been described in relation to image dilation, image erosion is also possible according to the method of the present invention. In order to erode an image, for example, to reformat a write-white formatted image to a write-black print format, the image pixels may be inverted, and the method performed on the inverted image as described above, using the same state determination rules. The corrected image, when inverted back again, provides a "white dilated" or eroded image. Alternatively, different state determination rules may be developed, and applied according to the method of the invention, for erosion of elements in an image.

Restrictive conditions have been added to some of the state rules described above for dilation of single input bits. Conditions which additionally smooth contours, perform other enhancement techniques, or tune for a particular print process may also be added to the state rules for specific applications. For example, the state determination rules may be written to cause dilation to the right and down, instead of left and up as shown in FIG. 10(b). The state determination rules may also be written so as to restrict dilation when image elements are very near each other.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

What is claimed:

1. A method for expanding features of an image represented by a plurality of binary pixels at a state transition portion of the image without affecting resolution of the image, a state transition defined by pixels at a first state adjacent to pixels at a second state, the method comprising the steps of:

storing a group of pixels representing a portion of the image which overlies said state transition in a first storage;

isolating a window in said group of pixels, said window including a pixel formation comprising first and second correctable pixels and pixels surrounding said first and second correctable pixels, said first and second correctable pixels being adjacent to said state transition;

for said first correctable pixel, determining a corrected binary pixel state according to a first set of state determination rules, said first set of state determination rules being based on binary states of said pixels in said pixel formation; and for said second correctable pixel, determining a corrected binary pixel state according to a second set of state determination rules, said second set of state determination rules being based on binary states of said pixels in said pixel formation and on said corrected binary pixel state of said first correctable pixel.

2. The method of claim 1, wherein the step of isolating said window of pixels further comprises isolating a 4-pixel by 4-pixel region of pixels including four central pixels and pixels surrounding said central pixels, said first and second correctable pixels each being one of said four central pixels.

3. The method of claim 2, wherein the steps of storing a group of pixels, isolating a window of pixels including four central pixels, and determining for first and second correctable pixels a corrected binary pixel state according to state determination rules are repeated so that each pixel in the image is one of said four central pixels.

4. The method of claim 1, wherein said first set of state determination rules further tends to favor a first state over a second state, and said second set of state determination rules further tends to favor a second state over a first state.

5. The method of claim 1, wherein said first state is black, said first set of state determination rules further tending to favor a corrected binary pixel state of black.

6. The method of claim 1, wherein said first state is white, said first set of state determination rules further tending to favor a corrected binary pixel state of white.

7. An apparatus for converting an image represented by a plurality of binary pixels from a first format at a first resolution to a second format at the first resolution, comprising:

means for inputting a portion of said plurality of binary pixels representing the image;

means for isolating a window of pixels in said portion of said plurality of binary pixels representing the image including a pixel formation comprising a plurality of adjacent correctable pixels and pixels surrounding said correctable pixels;

means for storing a set of state determination rules based on said pixel formation;

lookup means for determining a corrected binary pixel state for each correctable pixel according to said set of state determination rules; and means for outputting said corrected binary pixel states.

8. The apparatus of claim 7, wherein said storing means further comprises means for storing a first set of state determination rules tending to favor a first state over a second state for a first correctable pixel position at portions of the image having a state transition, and means for storing a second set of state determination rules tending to favor a second state over a first state for a second correctable pixel position, said second pixel position being adjacent to said first correctable pixel.

9. A method for converting an image from a first format into a second corrected format in a system for reproducing images image represented by a plurality of pixels, the method comprising the steps of:

storing a group of pixels representing a portion of said image in the first format in a first storage, each of said pixels having a binary state;

isolating a window in said group of pixels including a pixel formation comprising first and second adjacent correctable pixels and pixels surrounding said first and second correctable pixels;

for said first correctable pixel, determining a corrected binary pixel state in said second corrected format according to a set of state determination rules, said state determination rules being based on binary states of said pixels in said pixel formation; and for said second correctable pixel, determining a corrected binary pixel state in said second corrected format according to said set of state determination rules, said state determination rules for said second correctable pixel position further being based on said corrected binary pixel state of said first correctable pixel.

10. The method of claim 9, wherein for said first correctable pixel, said state determination rules further tending to favor a first state over a second state at portions of the image having a state transition; and for said second correctable pixel, said state determination rules further tending to favor a second state over a first state at portions of the image having a state transition.

11. The method of claim 9, wherein the steps of storing a group of pixels, isolating a window of pixels including first and second correctable pixels, and determining for said first and second pixels a corrected binary pixel state according to state determination rules are repeated so that each pixel in the image is one of said first or second pixels.

12. The method of claim 9, wherein for half bit dilation said isolating step further includes isolating a window of the pixels in said pixel group including a pixel formation comprising a 4-pixel by 4-pixel region including four central pixel positions E1, E2, E3, and E4, said first and second correctable pixels each being located at one of said four central pixel positions, said state determination rules being as follows:

for central pixel position E1, said pixel being surrounded by pixels (a,b,c,d,f,g,h,i,j,k,l,m,n,o,p) which are adjacent and surrounding said correctable pixel E1 in said pixel formation:

if pixels (b,d) are at a first state; or if pixels (d,h) are at a first state and pixel (f) is at a second state; or if pixels (a,b) are at a first state; or if pixels (a,d) are at a first state; or if pixels (b,c) are at a first state and pixel (h) is at a second state; or if pixels (d,g) are at a first state and pixel (f) is at a second state; or if pixel (b) is at a first state and pixels (a,c,d,f,g,h,i,j,m) are at a second state; or if pixel (d) is at a first state and pixels (a,b,c,f,g,h,i,l,o) are at a second state;

make output pixel (E1)=said first state;

otherwise E1=E1; for central pixel position E2, said pixel being surrounded by pixels (a,b,c,d,f,g,h,i,j,k,l,m,n,o,p) which are adjacent and surrounding said correctable pixel E2 in said pixel formation:

if pixels (b,d) are at a first state; or if pixels (d,h) are at a first state and pixel (f) is at a second state; or if pixel (b) is at a first state and pixels (a,c,d,f,g,h,i,j,p) are at a second state; or if pixel (d) is at a first state and pixels (a, b,c,f,g,h,i,l) are at a second state;

make output pixel (E2)=said first state;

otherwise E2=E2;

for central pixel position E3, said pixel being surrounded by pixels (a,b,c,d,f,g,h,i,j,k,l,m,n,o,p) which are adjacent and surrounding said correctable pixel E3 in said pixel formation:

if pixels (b,d) are at a first state; or if pixels (d,h) are at a first state and pixel (f) is at a second state; or if pixels (a,b) are at a first state; or if pixels (a,d) are at a first state; or if pixels (b,c) are at a first state and pixel (h) is at a second state; or if pixels (d,g) are at a first state and pixel (f) is at a second state; or if pixel (b) is at a first state and pixels (a,c,d,f,g,h,i,j) are at a second state; or if pixel (d) at a first state and pixels (a,b,c,f,g,h,i,p) are at a second state;

make output pixel (E3)=said first state;

otherwise E3=E3; and for central pixel position E4, said pixel being surrounded by pixels (a,b,c,d,f,g,h,i,j,k,l,m,n,o,p) which are adjacent and surrounding said correctable pixel E4 in said pixel formation:

if pixels (b,d) are at a first state; or if pixels (d,h) are at a first state and pixel (f) is at a second state; or if pixel (b) is at a first state and pixels (a,c,d,f,g,h,i,j) are at a second state: or if pixel (d) is at a first state and pixels (a,b,c,f,g,h,i,j,o) are at a second state:

make output pixel (E4)=said first state;

otherwise E4=E4.

13. The method of claim 9, wherein for full bit dilation said isolating step further includes isolating a window of the pixels of said image portion including a pixel formation comprising a 4-pixel by 4-pixel area including four central pixel positions, said first and second correctable pixels each being located at one of said four central pixel positions, said state determination rules being as follows:

for each central pixel position E, said pixel being surrounded by pixels (a,b,c,d,f,g,h,i,j,k,l,m,n,o,p) which are adjacent and surrounding said correctable pixel E in said pixel formation:

- if pixels (a,b) are at said first state; or
- if pixels (a,d) are at said first state and pixel (f) is at said second state; or
- if pixels (b,d) are at said first state; or
- if pixels (d,h) are at said first state and pixel (f) is at said second state; or
- if pixels (b,c) are at said first state and pixel (h) is at said second state; or
- if pixels (d,g) are at said first state and pixel (f) is at said second state; or
- if pixel (b) is at said first state and pixels (a,c,d,f,g,h,i) are at said second state; or
- if pixel (a) is at said first state and pixels (b,c,d,f,g,h,i) are at said second state;

make the state of output pixel (E)=said first state;

otherwise (E)=(E).

* * * * *